(12) United States Patent
Vorspel (10) Patent No.: US 10,494,287 B2
(45) Date of Patent: Dec. 3, 2019

(54) DEVICE FOR MANUFACTURING HOLLOW GLASS ARTICLES

(71) Applicant: HEYE INTERNATIONAL GMBH, Obernkirchen (DE)

(72) Inventor: Bernard Vorspel, Breda (NL)

(73) Assignee: HEYE INTERNATIONAL GMBH, Obernkirchen (DE)

(*) Notice: Subject to any disclaimer, the term of this patent is extended or adjusted under 35 U.S.C. 154(b) by 183 days.

(21) Appl. No.: 15/401,605

(22) Filed: Jan. 9, 2017

(65) Prior Publication Data

US 2017/0197861 A1     Jul. 13, 2017

(30) Foreign Application Priority Data

Jan. 11, 2016   (DE) .................. 10 2016 000 135

(51) Int. Cl.
     *C03B 9/447*      (2006.01)
     *C03B 40/027*     (2006.01)

(52) U.S. Cl.
     CPC ............ *C03B 9/447* (2013.01); *C03B 40/027* (2013.01)

(58) Field of Classification Search
     CPC .................................................. C03B 9/30–48
     See application file for complete search history.

(56) References Cited

U.S. PATENT DOCUMENTS

| | | | | |
|---|---|---|---|---|
| 3,242,075 | A * | 3/1966 | Hunter | C10M 1/08 427/388.1 |
| 3,508,893 | A * | 4/1970 | Duggan | C03B 9/3808 184/109 |
| 8,375,743 | B2 * | 2/2013 | Zanella | C03B 9/41 65/26 |
| 9,656,898 | B2 * | 5/2017 | Ghione | C03B 9/16 |
| 2003/0167799 | A1 * | 9/2003 | Tijerina-Ramos | C03B 9/165 65/68 |
| 2004/0011284 | A1 * | 1/2004 | Schucker | B05C 5/0216 118/688 |
| 2008/0152750 | A1 * | 6/2008 | Tanaka | B29C 43/021 425/357 |
| 2009/0061099 | A1 * | 3/2009 | Hendricks, Sr. | B05B 12/122 427/424 |
| 2009/0173105 | A1 * | 7/2009 | Zanella | C03B 9/41 65/26 |

(Continued)

FOREIGN PATENT DOCUMENTS

FR          2901551 A1     11/2007

*Primary Examiner* — Jodi C Franklin
(74) *Attorney, Agent, or Firm* — Fox Rothschild LLP (57) ABSTRACT

A device for manufacturing hollow glass articles, namely an IS machine, includes a plurality of adjacent stations (3), which form a row and respectively accommodate at least one blank mold that encloses a mold cavity, the inner walls of which have to be coated with a lubricant in accordance with a defined spray pattern by means of a spraying device (8) that can be moved along the row during the course of the glass forming operation. In order to ensure a reproducible spray pattern, a calibration station (10) is provided and equipped with a test mold (12), wherein the spraying device (8) can be displaced up to an inspection position, in which it is arranged opposite of the calibration station (10), in order to verify the correct function of a lubrication process based on a spray pattern in the test mold (12) and, if necessary, to correct the lubrication process.

4 Claims, 6 Drawing Sheets

(56) References Cited

U.S. PATENT DOCUMENTS

| | | | | |
|---|---|---|---|---|
| 2010/0132408 A1* | 6/2010 | Billieres | ............... | B22F 3/115 |
| | | | | 65/268 |
| 2010/0132409 A1* | 6/2010 | Billieres | ................ | C03B 9/48 |
| | | | | 65/374.12 |
| 2010/0237225 A1* | 9/2010 | Gotoh | .................. | B28B 7/346 |
| | | | | 249/115 |
| 2011/0296874 A1* | 12/2011 | Ghione | ................... | C03B 9/16 |
| | | | | 65/26 |
| 2012/0057018 A1* | 3/2012 | Arp | ...................... | B01J 2/006 |
| | | | | 348/86 |
| 2012/0308678 A1* | 12/2012 | Hayashi | ............... | B29C 33/58 |
| | | | | 425/90 |
| 2013/0095231 A1* | 4/2013 | Lee | .................... | G02F 1/1339 |
| | | | | 427/8 |
| 2013/0206173 A1* | 8/2013 | Zijlstra | ................ | B08B 1/008 |
| | | | | 134/6 |
| 2016/0067737 A1* | 3/2016 | Hudaff | .............. | B29C 37/0032 |
| | | | | 427/8 |

\* cited by examiner

DEVICE FOR MANUFACTURING HOLLOW GLASS ARTICLES

BACKGROUND

The invention pertains to a device for manufacturing hollow glass articles and, more particularly, to the lubrication of the molds for the glass articles.

Between the infeed of a molten glass gob and the ultimate delivery of a formed hollow glass article, a glass forming machine, particularly an IS machine, comprises multiple assemblies, mechanisms, measuring and handling systems that not only require monitoring, but also servicing. This concerns, for example, the lubrication state of molds, particularly of the blank molds. The surfaces of these blank molds, which come in direct contact with the molten glass, require careful lubrication to achieve a uniform and constant product quality over time, wherein the lubrication ensures an even distribution of the glass material being introduced within the mold cavity and simplifies the removal of the preform, while still mechanically unstable, from the mold.

It is generally known to utilize a handling system such as, e.g., a robot that is equipped with a spraying device for lubricating the blank molds. In this case, however, it is not possible to check the spray pattern, the quantitative distribution on the walls of the blank mold, the adjustment, particularly the positioning of the spraying device, etc. This can be attributed to the fact that a glass gob is already introduced into the mold cavity immediately after the spraying processes completed such that the state of a lubricant layer cannot be manually controlled.

Patent publication FR 2 901 551 A1 describes a method for automatically lubricating the molds used for manufacturing hollow glass articles, wherein a robot carrying a lubricating tool can be moved along the row of adjacently arranged blank molds of an IS machine on a rail. The lubricating tool consists of a lance, on the free end of which quills are arranged, wherein the mold halves of the blank mold are in the closed state during the lubrication of its inner walls. The mold halves are transferred into the open state in order to lubricate the associated neck mold, wherein the lance always is inserted into the blank mold or into the intermediate space between the mold halves, respectively. The individual phases of the lubricating process are carried out with the cooperation of a central control, but this publication contains no information concerning the control of the lubricant layer introduced into the blank molds.

In light of the circumstances described above, an objective of present invention is to enhance a device of the above-described type with respect to an effective control of the lubricant application on the inner walls of the blank molds used. In such a device, this objective is attained with the characteristics of the invention as described below.

SUMMARY OF THE INVENTION

Accordingly, the present invention provides a device for manufacturing hollow glass articles that provides lubrication to the inner sides of the mold cavity of a blank mold, and which can inspect and adjust the spray pattern of the lubricant. It is essential to provide a calibration station that defines an inspection position and is designed for controlling and, if applicable, readjusting a spray pattern in connection with the spraying device, which is designed for applying a lubricant on the inner walls of the blank molds and can be moved along the row of stations of the IS machine, as well as stopped in defined working positions that are respectively assigned to a blank mold. Other parameters of the lubricant being applied, particularly the thickness and uniformity of the lubricant layer, can also be controlled within a spray pattern, the position and shape of which likewise have to be inspected. The calibration station can be used in many different ways. For example, it can be used for controlling the correct function and positioning of the spraying device. In this way, it is also possible to detect, for example, blockages or other disruptions in the lubricant supply. The calibration station can be used for correcting the adjustment of the spraying device as long as this adjustment concerns the position and the condition of the lubricant within the spray pattern. It can ultimately also be used for preparing a spraying schedule when a new type of lubricant is used, wherein this spraying schedule concerns, for example, the thickness of a lubricant layer or its distribution. The optimization of the spray pattern by adapting the thickness of a lubricant layer within the blank mold provides a significant contribution to realizing an optimal gob distribution in the blank mold.

According to the characteristics of another embodiment of the invention, a test mold is provided in the calibration station and used as reference mold for providing a functionally appropriate spray pattern. The test mold is modeled on the shape and position of the regular blank molds such that an adjustment of all parameters of the spraying device can be realized based on an alignment of the spray pattern in the test mold. This is achieved with a corresponding alignment of working and inspection positions.

In one form, the test mold consists of two mold halves that can be pivoted between an open and a closed position analogous to the blank molds. The introduction of a lubricant typically takes place in the open state of the respective test mold or blank mold.

Additional characteristics of the invention concern the further design of the calibration station, particularly with respect to its equipment. Accordingly, this calibration station is designed for initiating and carrying out an analysis of the spray pattern in a partially automated fashion and thereby contributes to achieving stable and, in particular, reproducible test results. A number of properties of the spray pattern can be easily and quickly determined with the assistance of a camera in connection with a computer-assisted evaluation system such that a fast inspection process can be realized.

According to other features, the calibration device is equipped with means for the automatic exchange of spraying tools. In this way, its ability to adapt automatically to changing conditions of the lubricating process is improved.

The characteristics of another form of the invention specify the arrangement and guidance of the spraying device. For this purpose, a manipulation element consisting of multiple parts or multiple sections is provided and held in a displaceably arranged housing, wherein the constructive design of said manipulation element defines the required axes of motion for optimally positioning the spraying device relative to the inner surfaces of the test mold and the blank molds to be sprayed. The housing therefore forms a movable carrier system for the spraying device. Drives are assigned to all axes of motion of the manipulation element such that the spraying device can be exactly and reproducibly positioned.

The characteristics of other forms of the invention concern a further constructive specification of the calibration station. It is essential that this calibration station feature a housing, which has a key-like structure that is open toward the glass forming machine and otherwise closed. The inspection process, particularly the motions of the manipulation element, therefore takes place in a protected space such that the manipulation element cannot cause any accidents.

According to the preceding explanations, the object of the invention provides a simple option for realizing and controlling the lubricant spray pattern in a blank mold of a glass forming machine in a reproducible fashion to improve the uniformity of the gob distribution in the blank mold.

BRIEF DESCRIPTION OF THE DRAWINGS

The invention is described in greater detail below with reference to the attached drawings. In these drawings.

DETAILED DESCRIPTION

Figure 1:
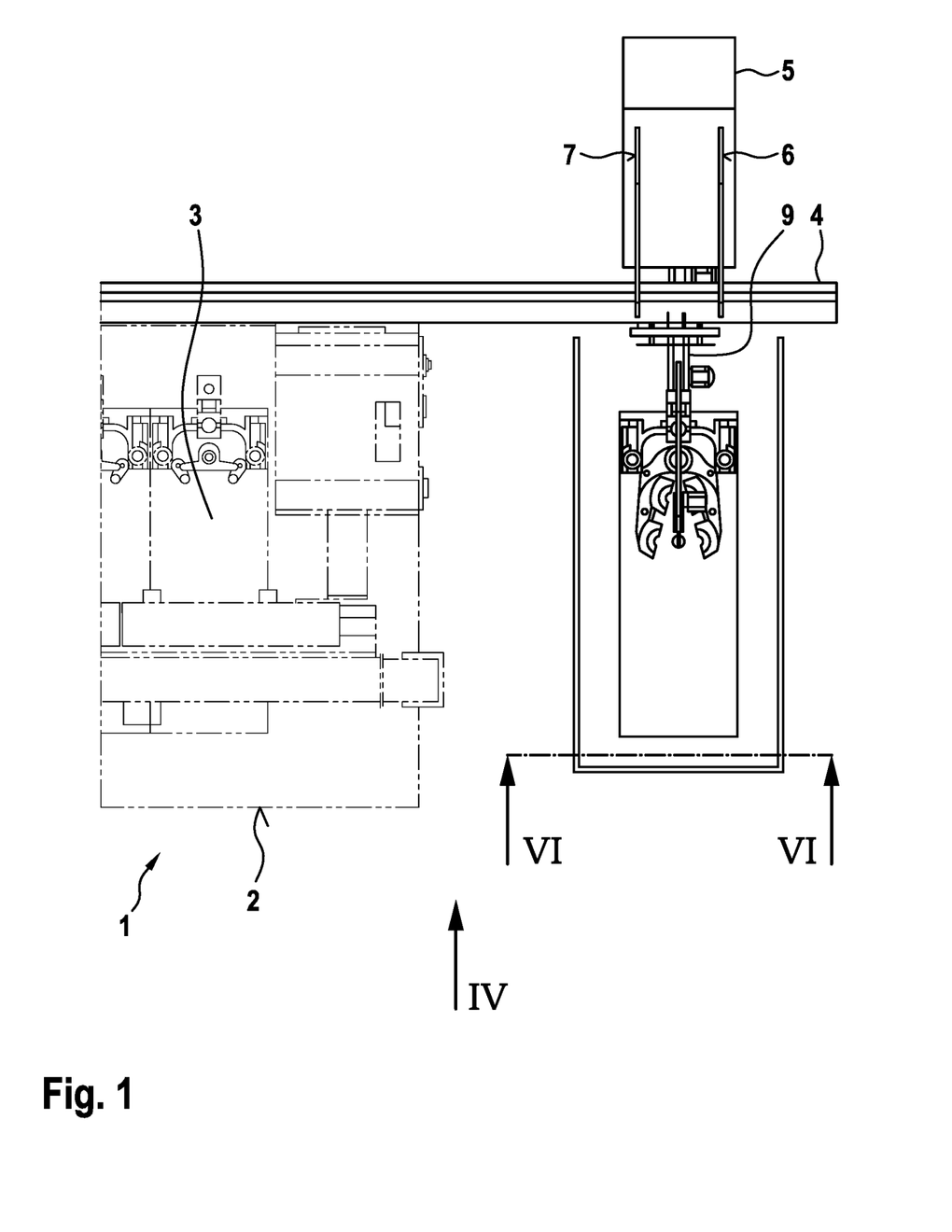
FIG. 1 shows an illustration of a lateral end section of a glass forming machine in the form of a top view.
Figure 2:
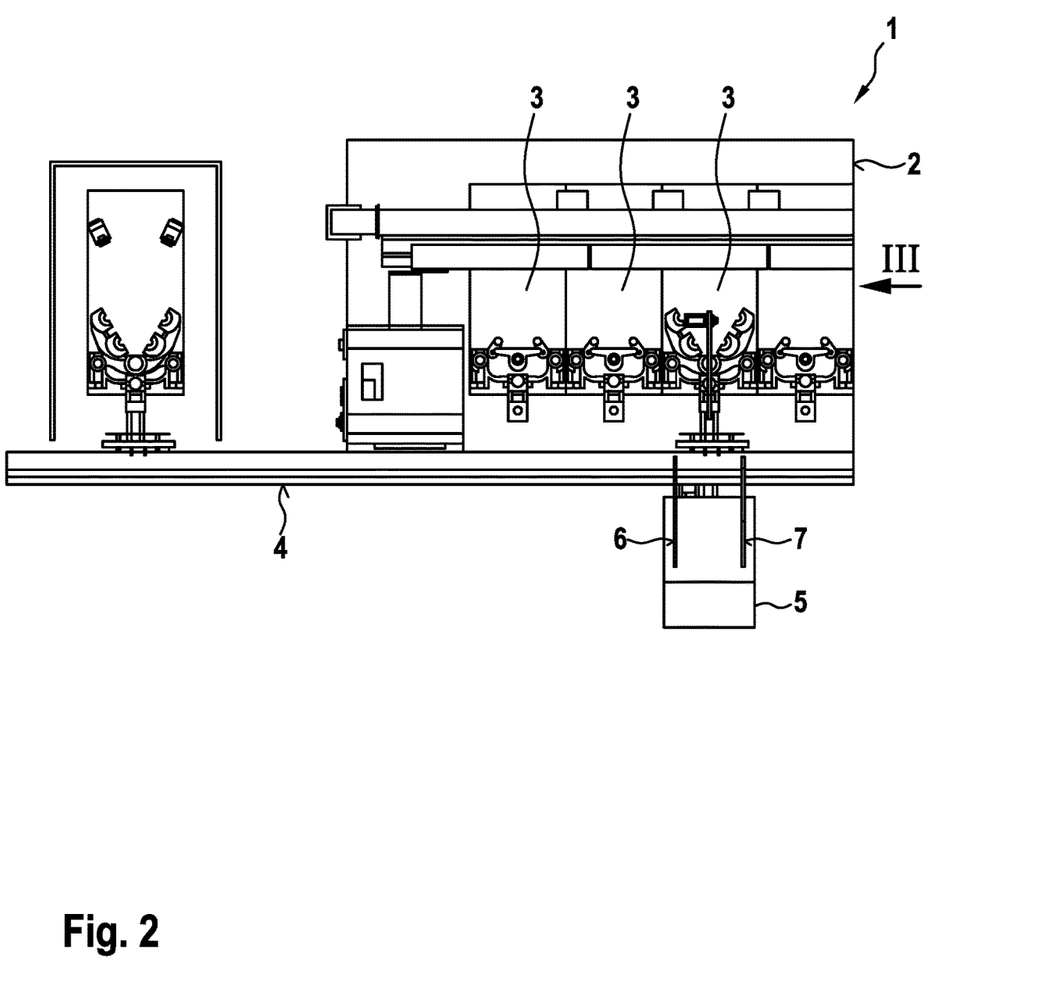
FIG. 2 shows an illustration according to FIG. 1 in the form of an enlarged view.
Figure 3:
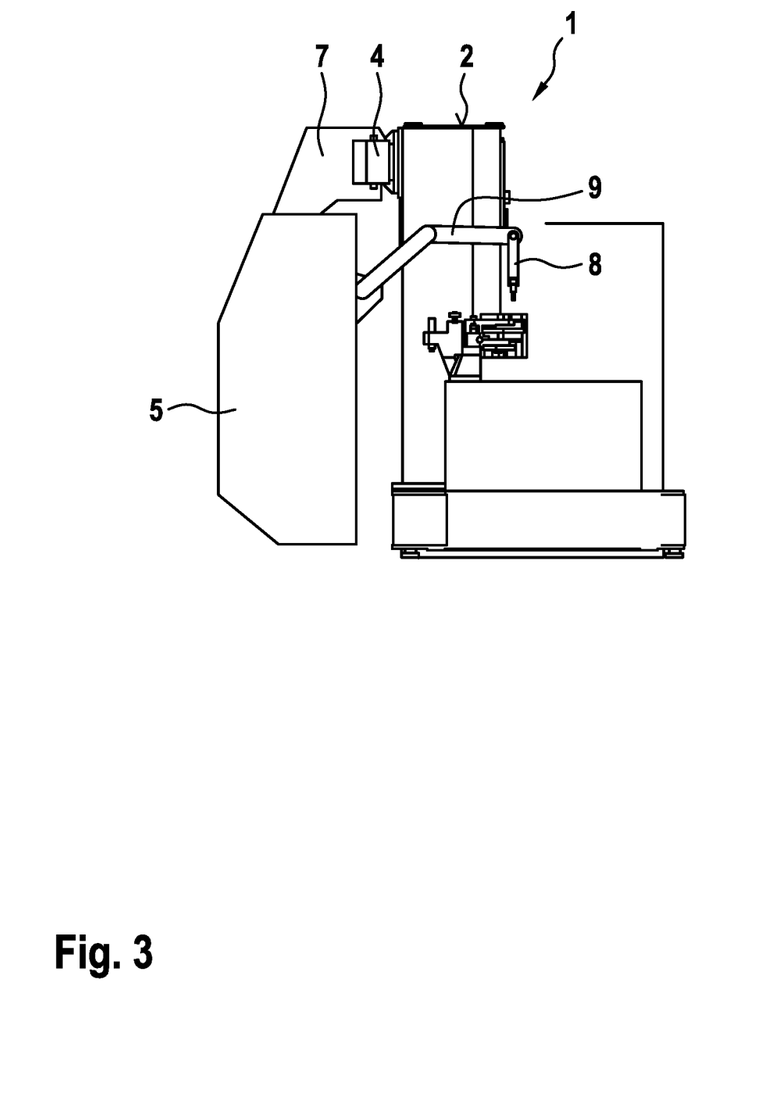
FIG. 3 shows a partial side view of the glass forming machine along the viewing direction III in FIG. 2.

The description initially refers to the drawings in FIGS. 1 to 3.

In these figures, the reference symbol 1 identifies a glass forming machine, namely an IS machine, in the machine frame 2 of which a plurality of stations 3 are mounted, wherein multiple blank molds are respectively accommodated in said stations. The stations 3 are arranged adjacent to one another and a rail-like guide 4, which is mounted on an upper region of the machine frame 2, extends on the side of the machine frame 2 carrying the blank molds.

The guide 4 extends parallel to a supporting surface of the glass forming machine 1 and a housing 5, which can be displaced from one end of the guide 4 to its other end in a motor-driven fashion, as well as locked in any intermediate position, is attached to said guide, wherein this motor-driven displacement of the housing is not illustrated in the drawings. For this purpose, the housing 5 is provided with two brackets 6, 7 that are engaged with the guide 4.

The housing 5 serves, among other things, for accommodating a spraying device 8 that is arranged on the free end of a multi-section manipulation element 9. The manipulation element 9 can be pivoted between an inactive position, in which it is largely retracted into the housing 5, and an active position, in which the spraying device 8 is suitably arranged for transferring a lubricant on the inner surfaces of a blank mold. A not-shown drive is assigned to this pivoting motion and connected to a machine control of the glass forming machine 1 such that the pivoting motion can be carried out in a motor-driven fashion. In other respects, the manipulation element 9 is designed with as many axes of motion as required for realizing a sufficient mobility for carrying out the spraying process, particularly for positioning the spraying device 8.

Figure 4:
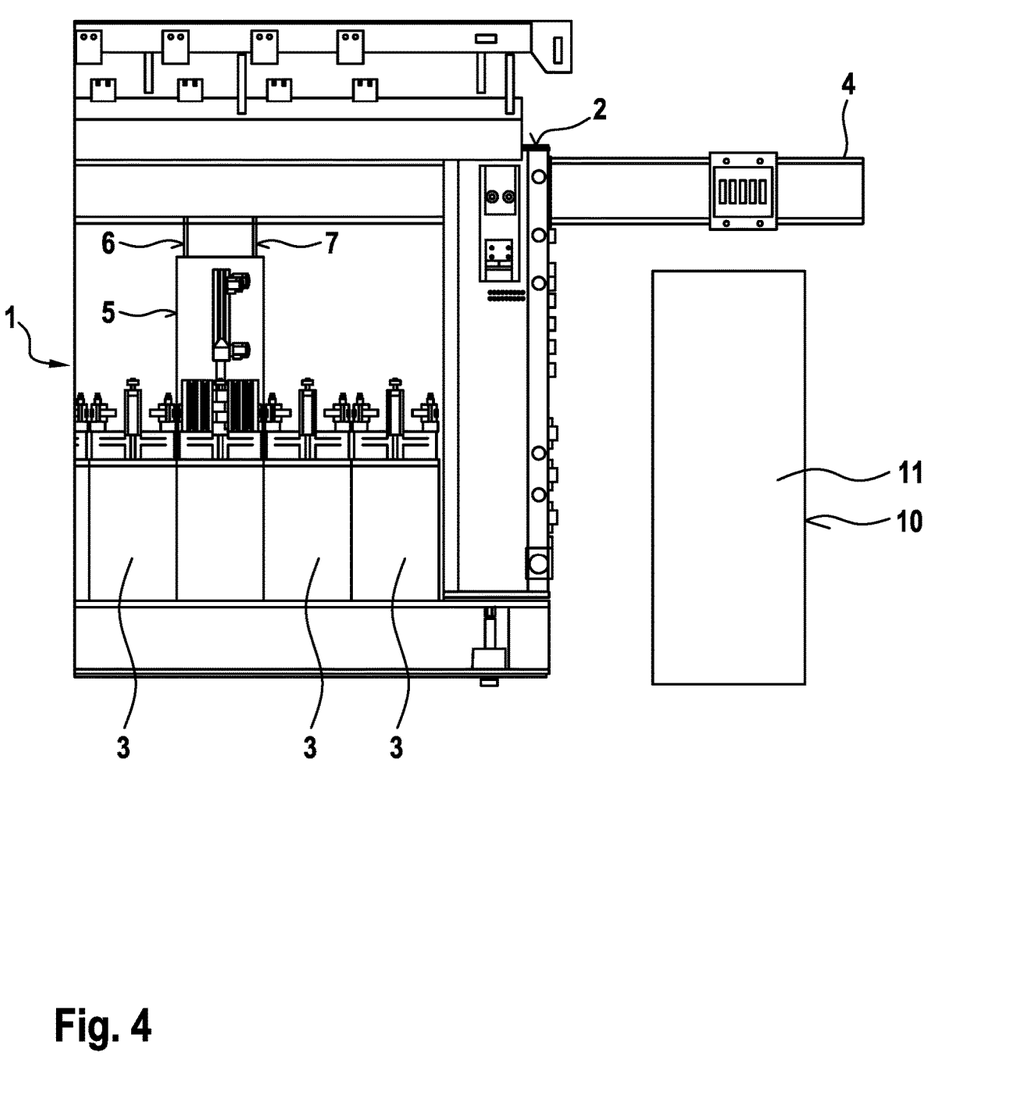
FIG. 4 shows a view of the end section of the glass forming machine along the viewing direction IV in FIG. 1.
Figure 5:
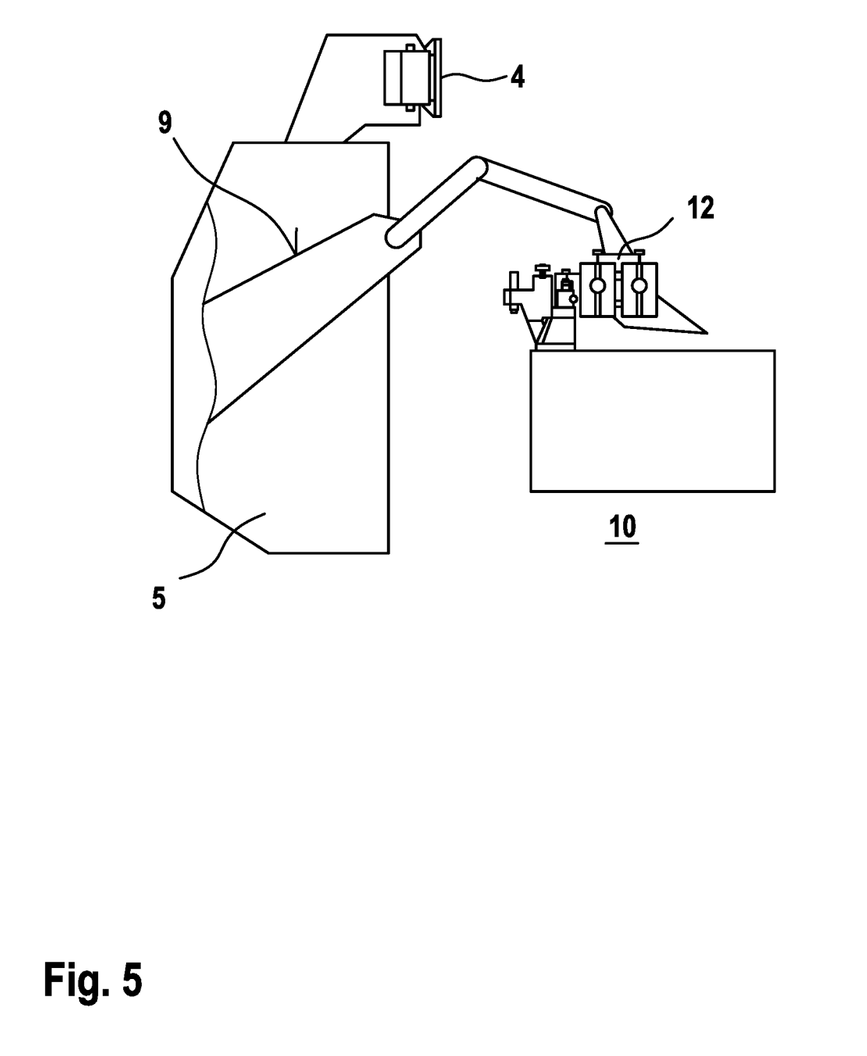
FIG. 5 shows an illustration according to FIG. 3 in the form of an enlarged view.
Figure 6:
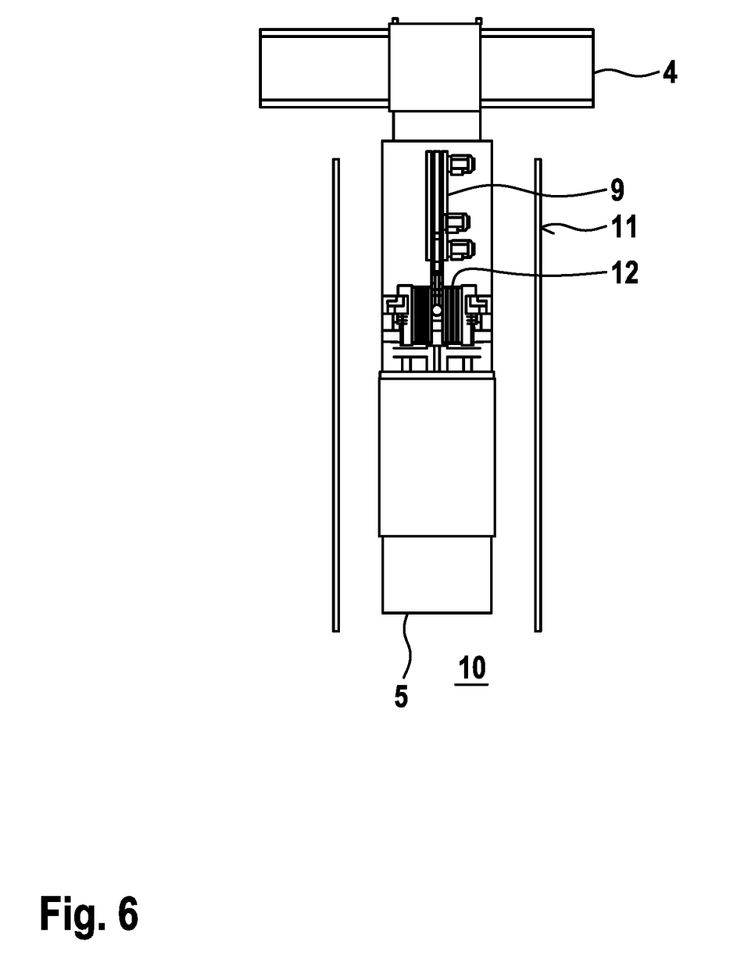
FIG. 6 shows a partial view along the plane of section VI-VI in FIG. 1.

The following portion of the description additionally refers to the drawings in FIGS. 4 to 6, in which functional elements corresponding to those in FIGS. 1 to 3 are identified by the same reference symbols and therefore do not require a detailed description.

The guide 4 extends beyond a lateral end of the glass forming machine 1 up to a calibration station 10 and is arranged such that the housing 5 can be displaced into an inspection position, in which it is arranged opposite of the calibration station 10 and can interact therewith. The calibration station 10 consists of a housing 11, which also may be at least partially realized in the form of a protective screen that is open toward the housing 5, but otherwise closed.

The housing 11 contains a test mold 12 that structurally corresponds to the blank molds installed in the glass forming machine 1. With respect to its height and orientation relative to the housing 5, the position of the test mold 12 furthermore corresponds to that of the blank molds of the glass forming machine 1.

The calibration station 10 may be additionally equipped with a not-shown camera or another measuring system that is designed for measuring and evaluating the distribution of a lubricant layer on the inner side of the mold cavity of the test mold 12 in connection with a computer-assisted evaluation system, particularly an image processing system. The housing of the calibration station 10 is not illustrated in FIG. 5 in order to provide a better overview.

The result of such an inspection of a lubricant layer applied on the aforementioned inner sides of the test mold 12 can be used in many different ways. This inspection particularly includes a spray pattern, the layer thickness of a transferred lubricant layer, its uniformity and position on the inner sides of the test mold 12, etc. In this way, misadjustments of the manipulation element 9 in the housing 5 and of the spraying device 8 arranged thereon, as well as defects such as, e.g., the partial blockage of outlet openings of the spraying device 8, can be detected and corrected in order to resume the regular operation of the glass forming machine 1 with a lubrication system that functions correctly in every respect.

The result of such an inspection can particularly be used for optimizing a spray pattern, namely with respect to the most advantageous lubricant layer thickness and lubricant layer distribution on the inner walls of the blank mold for realizing an optimal gob distribution in the blank mold.

The test mold 12 consists of two mold halves analogous to the blank molds and is preferably in an open position during the described inspection process.

The preceding description shows that the arrangement of a calibration station 10 on a glass forming machine 1 makes it possible to reliably verify the correct function of the spraying device 8, as well as its manipulation element, based on an evaluation of the detected spray pattern such that, for example, adjustments can be corrected and defective components can be repaired or replaced in order to realize a functionally appropriate spray pattern, on which the operation of the glass forming machine can subsequently be based.

REFERENCE LIST

1 Glass forming machine
2 Machine frame
3 Station
4 Guide
5 Housing
6 Bracket
7 Bracket
8 Spraying device
9 Manipulation element
10 Calibration station
11 Housing
12 Test mold

The invention claimed is:

1. An individual section machine for manufacturing hollow glass articles, comprising:
   a plurality of stations arranged adjacently in a row, each of which having at least one blank mold which has a mold cavity;
   a spraying device which can be displaced along the row of stations and stopped in discrete working positions that are respectively assigned to said stations to apply a lubricant on inner sides of the mold cavity of said blank mold;
   a first housing;
   a manipulation element having one end mounted within said first housing and another end to which the spraying device is fastened, said first housing configured for guiding adjustment tools for adjusting said spray pattern; and
   a calibration station configured to inspect and adjust a spray pattern that represents the distribution of the lubricant in a defined surface area on the inner walls of the blank mold, wherein: the spraying device is displaceable into an inspection position assigned to the calibration station; the first housing is displaceable along the length of the individual section machine to the inspection position where it is arranged opposite of the calibration station; and the calibration station includes:
   a test mold, said test mold disposed to be in a position relative to said spraying device when the spraying device is in the inspection position which corresponds to the position of the spraying device relative to a said blank mold in a working position;
   at least one camera or a measuring device for measuring a spray pattern in only the test mold and at least one parameter of a lubricant layer within the spray pattern in only the test mold; and
   a second housing which is open toward the first housing when the first housing is in the inspection position and otherwise is closed.

2. The individual section machine according to claim 1, wherein the test mold consists of two mold halves that can be pivoted between an open and closed position.

3. The individual section machine according to claim 1, wherein the second housing at least partially comprises a screen.

4. The individual section machine according to claim 1, wherein the test mold consists of two mold halves that can be pivoted between an open and closed position.

* * * * *